3,707,376
PROCESS OF SENSITIZING SILVER HALIDE EMULSION WITH POLY(ALKYLENE OXIDE) AND SULFUR COMPOUNDS
Albert Louis Van Stappen, Rumson, N.J., Karl Schwarz, am Taubhaus, Germany, and Hans Weber, deceased, by Charlotte Weber, Neu-Isenberg, Germany, and Inge Lau, Brussels, Belgium, inheritors; said Van Stappen and said Schwarz assignors to E. I. du Pont de Nemours and Company, Wilmington, Del.
No Drawing. Filed Nov. 23, 1970, Ser. No. 92,254
Claims priority, application Germany, Nov. 21, 1969, P 19 58 467.9
Int. Cl. G03c 1/28
U.S. Cl. 96—108                                      6 Claims

ABSTRACT OF THE DISCLOSURE

Process for improving the sensitivity/fog ratio of photographic silver halide emulsions sensitized with poly(alkylene oxide) compounds and sulfur sensitizers by adding the sulfur sensitizer during or immediately after silver halide precipitation. Gelatin emulsions and sodium and ammonium thiosulfate are preferred. Full sensitization with the poly(alkylene oxides) is attained without increasing development fog.

BACKGROUND OF THE INVENTION

The object of the present invention is to provide a process which improves the sensitivity/fog ratio of photographic silver halide emulsions that are sensitized with poly(alkylene oxide) compounds.

It is known that the sensitivity of silver halide emulsions that are already chemically ripened to their optimum sensitivity values by the addition of sulfur sensitizers and/or gold salts can be increased considerably through the addition of poly(alkylene oxide) compounds. It also is known that the sensitizing action of these compounds is usually connected inseparably with a fogging effect. Naturally, this undesirable secondary action strongly impairs the practical use of these compounds. Moreover, it is known that many of the customary stabilizers do not eliminate the fog caused by the poly(alkylene oxide) compounds and only a few stabilizers, for example, inorganic and organic mercury compounds, can prevent fog formation without impairing the sensitivity of the emulsion. In these cases, the addition of highly active stabilizers causes a loss in the sensitivity achieved by the use of poly(alkylene oxide) compounds, that is, the sensitivity-increasing action of these compounds is not fully utilized. Therefore, the problem of the invention is to produce highly sensitive silver halide emulsions sensitized with poly(alkylene oxide) compounds, said emulsions possessing an improved sensitivity/fog ratio.

SUMMARY OF THE INVENTION

Accordingly, this invention solves the problem by adding known sulfur sensitizers to the light-sensitive emulsion during or immediately after the conclusion of precipitation of the silver halide. If one then adds the poly(alkylene oxide) compounds at the later stages of preparation of the emulsion produced in this way, a higher sensitivity can be achieved at the same or even lower fog values, than when the same poly(alkylene oxide) compounds are added to an emulsion in which the sulfur sensitization is carried out in the conventional manner, that is, during the digestion or chemical sensitization or chemical ripening step. This effect was completely surprising and could not have been expected, since it is known from a number of publications that it is unimportant for the effect of sulfur sensitization at which stage in the emulsion production they are added.

DESCRIPTION OF THE PREFERRED EMBODIMENT

In the practical production of an emulsion prepared according to the invention, it is best to allow the sulfur sensitizers to run in with the silver nitrate solution into the halogen salt solution. However, the sulfur compounds also can be added to the halogen salt solution or, by using other more complicated methods of introduction, can be contained in any other solution used during or imediately following the precipitation stage. Naturally, the quantity of sulfur sensitizers added can vary with the effect desired, but generally amounts to between 10 and 100 mg. per mole of silver halide.

The path of the emulsion production then follows in the usual manner, that is, after the precipitation has been concluded, the emulsion is subjected to physical ripening, subsequently freed from the excess salts and after-ripened, i.e., chemically ripened. The poly(alkylene oxide) compounds used to increase the sensitivity are added to the light-sensitive emulsions in the customary manner, namely, during the process of chemical ripening or at any desired point before coating the emulsion. Practically all of the poly(alkylene oxide) compounds described in the literature are usable, for example, the known poly(ethylene glycols) and their condensation products with acids, alcohols, amines, or also other derivatives. Such compounds are described in U.S. Pats. 2,240,472, 2,400,532, 2,423,549, 2,441,389, 2,955,037 and 2,965,487.

Many suitable sulfur sensitizers likewise are known, for example, from U.S. Pat. 1,564,944. Inorganic sulfur sensitizers, such as sodium, potassium or ammonium thiosulfate have been found to be especially suitable for carrying out the process described. Chiefly, silver bromide-iodide emulsions are suitable as photographic silver halide emulsions. In addition, the emulsions may contain other additives, such as gold salts, stabilizers, optical sensitizers, antifoggants, hardening agents, etc. The emulsions may also contain the macromolecular, waterpermeable organic binders that are listed in patents listed in the previous paragraph.

The importance of this inventive process lies in the more effective use of the sensitivity-increasing action of poly(alkylene oxide) compounds; that is, emulsions with an improved sensitivity/fog ratio can be produced without requiring the addition of other sensitivity-increasing emulsion additives which always make a process more complicated and expensive.

The invention is illustrated but not restricted by the following examples:

Example 1

An optically unsensitized silver halide emulsion consisting of about 98 mole percent of AgBr and about 2 mole percent of AgI and containing about 5% gelatin and about 10% silver halide, is treated with 15 mg. of ammonium thiosulfate per mole of silver halide during the chemical ripening and after precipitation, and then completely ripened to reach the optimum sensitivity values (Sample A). Then, 0.7 g. per mole of silver halide of poly(ethylene oxide) with an average molecular weight of 4,000* is added to the emulsion.

In a parallel experiment, the same emulsion was produced and divided into three parts—B, C and D. The only difference from the comparision sample is that the sulfur sensitizer was added to these samples during the precipitation stage. In the case of sample B, 15 mg. of ammonium thiosulfate per mole of silver halide was added to the silver halide solution. In sample C, 15 mg. of ammonium thiosulfate was added to the halogen salt solution used in the precipitation. In sample D, 15 mg. of

*"Carbowax 4000."

ammonium thiosulfate per mole of silver halide was added to the emulsion immediately after conclusion of the precipitation. All four samples were ripened chemically in the customary manner and equal quantities of gold salts, stabilizers, and Carbowax 4000, etc., were added. The four emulsions were then coated on a polyester film support and dried. The film samples were then exposed in a sensitometer and processed in a developer with the following composition:

| | G. |
|---|---|
| Hydroquinone | 30 |
| 1-phenyl-3-pyrazolidone | 1 |
| $Na_2SO_3$ anhydrous | 60 |
| KOH | 23 |
| $NaBO_2 \cdot 4H_2O$ | 20 |
| Water to 1 liter. | |

After fixing and drying, evaluation gave the following results:

| Sample | Relative sensitivity | Fog after— | |
|---|---|---|---|
| | | 3 min. development at 28° C. | 6 min. development at 28° C. |
| A | 100 | 0.08 | 0.20 |
| B | 110 | 0.03 | 0.07 |
| C | 108 | 0.03 | 0.07 |
| D | 110 | 0.03 | 0.07 |

Example 2

During chemical ripening, the emulsion described in Example 1 was treated with 10 mg. of sodium thiosulfate per mole of silver halide, and completely ripened to achieve the optimum sensitivity value. Then, 0.07 g. per mole of silver halide of poly(ethylene oxide) with an average molecular weight of 4000 was added to the emulsion. This emulsion served as Comparison Sample A. In a parallel experiment, the same emulsion was produced with the single difference that the sulfur sensitizer was added during the precipitation and, in fact, 10 mg. of sodium thiosulfate per mole of silver halide was added to the halogen salt solution (Sample B).

The emulsions were processed further as given in Example 1. Evaluation gave the following results:

| Sample | Relative sensitivity | Fog after— | |
|---|---|---|---|
| | | 3 min. development at 28° C. | 6 min. development at 28° C. |
| A | 100 | 0.06 | 0.23 |
| B | 111 | 0.03 | 0.06 |

As can be seen from the examples, an important advantage of this invention is that highly sensitive emulsions can be prepared that are very resistant to fog produced by longer development periods, that is, emulsions which possess an improved speed/fog ratio. The presence of the poly(alkylene-oxide) compounds can thus be fully utilized when the sensitization is carried out in the prescribed manner. This surprising and useful fact could not have been predicted by the prior art.

The embodiments of the invention in which an exclusive property or privilege is claimed are defined as follows:

1. In a process for improving the sensitivity of a photographic silver halide emulsion comprising the addition of at least one sulfur sensitizer and one poly(alkylene oxide) compound, the improvement characterized in that the addition of the sulfur compound takes place during or immediately after conclusion of precipitation of the silver halide.

2. Process according to claim 1, wherein an inorganic sulfur sensitizer compound is used.

3. Process according to claim 2, wherein sodium or ammonium thiosulfate is used.

4. Process according to claim 1, wherein poly(ethylene oxides) with average molecular weights of 1500 to 6000 are used.

5. Process according to claim 1, wherein the emulsion is a gelatin emulsion and the sulfur sensitizer is added during precipitation.

6. Process according to claim 4, characterized in that a poly(ethylene oxide) with an average molecular weight of 4000 is used as the poly(alkylene oxide) compound.

References Cited

UNITED STATES PATENTS

| 3,068,102 | 12/1962 | Chiesa et al. | 96—107 |
| 3,150,977 | 9/1964 | Hart et al. | 96—107 |
| 3,189,458 | 6/1965 | Herz | 96—107 |
| 3,226,232 | 12/1965 | Dersch et al. | 96—109 |

J. TRAVIS BROWN, Primary Examiner

W. H. LOUIE, JR., Assistant Examiner

U.S. Cl. X.R.

96—107, 109